Aug. 25, 1959

C. H. FISHER 2,900,897

PORTABLE BARBECUE

Filed May 27, 1954

INVENTOR.
CHARLES H. FISHER
BY George B White
ATTORNEY

Aug. 25, 1959
C. H. FISHER
2,900,897
PORTABLE BARBECUE
Filed May 27, 1954
2 Sheets-Sheet 2
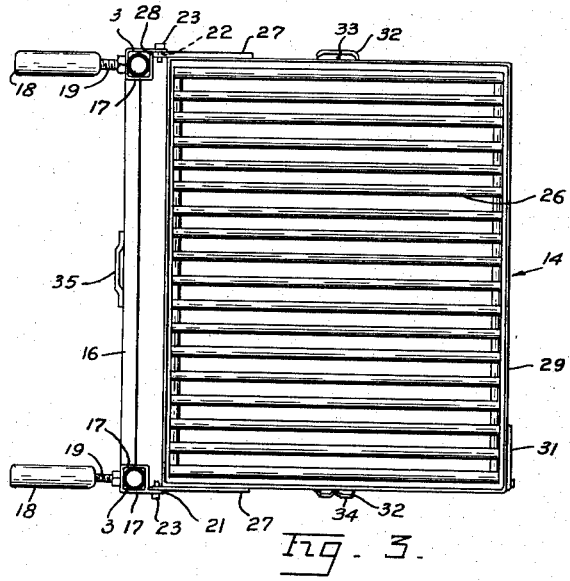
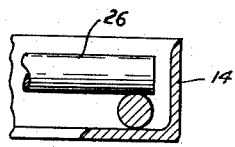
Fig. 4.
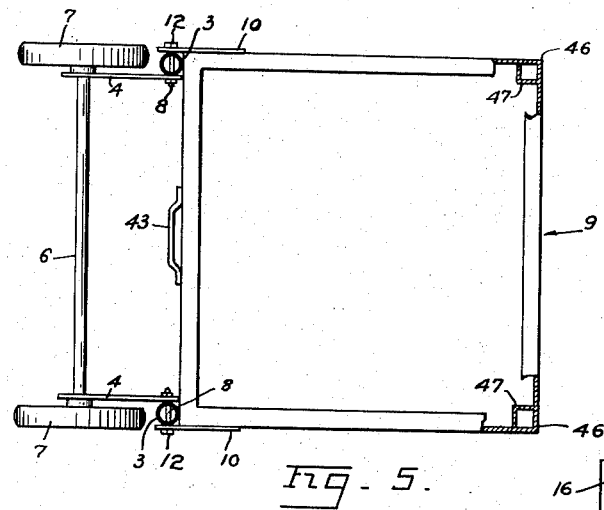
Fig. 5.
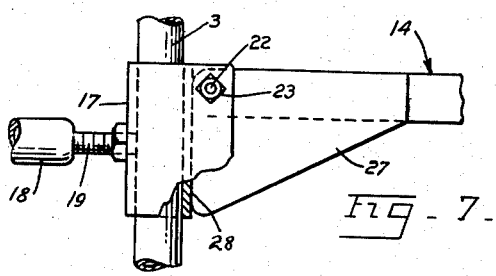
Fig. 7.
INVENTOR.
CHARLES H. FISHER
BY George B White
ATTORNEY

2,900,897
PORTABLE BARBECUE
Charles H. Fisher, Redwood City, Calif.

Application May 27, 1954, Serial No. 432,652

1 Claim. (Cl. 99—340)

This invention relates to a portable barbecue device.

The primary object of this invention is to provide a barbecue stand or device with a fire pan and a grid frame so arranged as to permit easy transportation, use in an indoor fireplace as well as outdoors; and the parts of which are demountable and foldable in such a manner as to facilitate storing or shipping as a compact unit, and which render the setting up and operation of the device simple and easy.

With the foregoing and other objects in view, which will be made manifest in the following detailed description, reference is had to the accompanying drawings for the illustrative embodiment of the invention, wherein:

Fig. 3 is a top plan view of my portable barbecue with the grill in position and the handle bars shown in section.

Fig. 4 is a fragmental sectional view of a corner of the grill holder frame and the grill.

Fig. 5 is a sectional top plan view of my portable barbecue showing the fire holding pan partly in section.

Fig. 6 is a fragmental partly sectional view of the mounting at a corner of the grill frame, and Fig. 7 is a fragmental side view of said grill frame mounting.

Figures 1, 2:
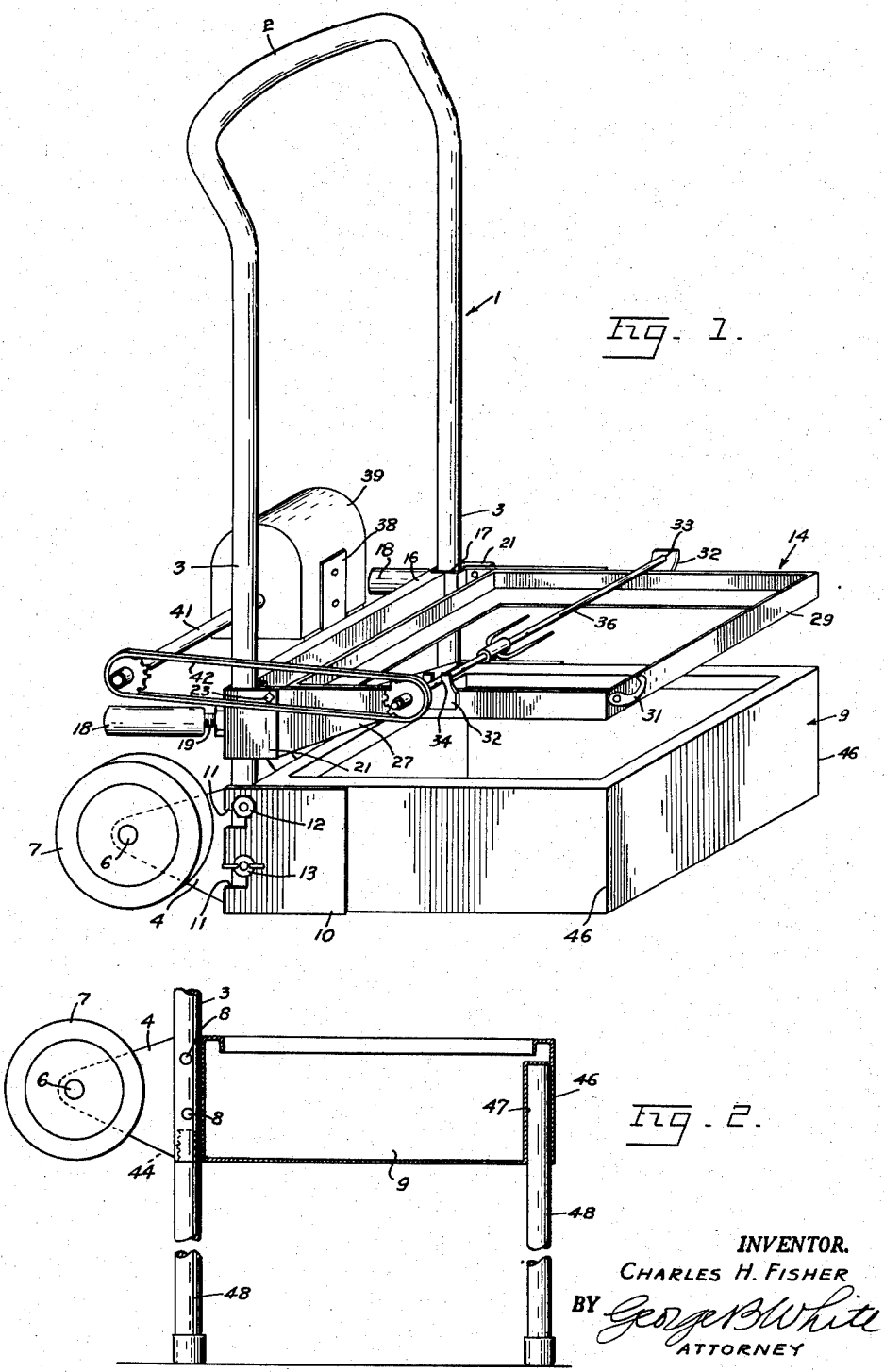
Fig. 1 is a perspective view of my portable barbecue in operative position.
Fig. 2 is a sectional view of the lower portion of my portable barbecue supported on legs in an elevated position.

In carrying out my invention I make use of an open frame 1 which in this form is U-shaped. The connected end or horizontal bar 2 of the frame 1 is adapted to be used as a handle in pushing the device. On the lower ends of the vertical sides or legs 3 of this frame are provided brackets 4 through which extends a brace or axle 6 on the ends of which latter are suitably mounted rotatable wheels 7 to facilitate the rolling of the frame and the barbecue device thereon.

A pair of bolts 8 which extend through the brackets 4 and through the lower ends of the veritcal frame legs 3 project to the outside of said legs 3 and function as supports for a charcoal carrying element such as a pan 9 adapted to contain and transport charcoal or the like ambers. The pan 9 is made of metal or of other suitable material to hold the ambers for the barbecue on its bottom and between its four sides. The pan 9 is open at its top. Parallel flanges 10 extend from opposite sides of the pan 9 beyond the included back side. Each flange 10 is provided with a pair of vertically aligned bayonet slots 11 which fit over the respective bolts 8 so as to hold the pan on the frame. The upper bolt 8 on each side is provided with a suitable nut 12 and the lower bolt 8 is provided with a wing nut 13 for tightening the flanges 10 in position. In this manner the pan 9 can be easily mounted on or detached from the lower end of the U-shaped frame 1. It is to be noted that the brackets 4 supporting the wheels 7 extend oppositely to the pan 9 so that the pan 9 is on one side of the frame and the wheels 7 are on the other side of the frame, and usually the operator rolls the frame 1 so that the operator is on the same side where the wheels 7 are located.

A grill frame 14 is foldably supported on a cross frame 16 spaced above the pan 9. The cross frame 16 is adjustable along the vertical legs 3 of the U-shaped frame 1 so as to suitably space the grill frame 14 from the fire in the pan 9. At each end of the cross frame 16 is provided a sleeve 17 slidable on the adjacent leg 3 of the frame 1. A handle 18 at each end of the cross frame 16 is secured by a threaded stud 19 threaded through the sleeve 17 so that it may be pressed tightly against the frame legs 3 and operate as a set screw for holding the cross frame 16 and the grill frame 14 thereon in adjusted position at a selected height. The handles 18 are covered with suitable heat-insulating material to facilitate the manipulation for raising and lowering the cross frame 16 and the grill frame 14 therewith.

The grill frame 14 is pivoted on the cross frame 16. For this purpose a vertical ear 21 extends from each sleeve 17 toward the space above the pan 9. In each ear 21 is a pivot hole or bearing 22 in which is held a pivot bolt 23 which latter is threadedly secured into the adjacent side of the grill frame 14. The grill frame 14 is preferably made of angle irons on all four sides so as to provide a ledge all around on which the usual grill 26 may be placed and supported.

On the outside of the grill frame at each pivoted corner thereof is fixed preferably by welding a generally triangular plate 27 through which the pivot bolts 23 extend. The vertical edge 28 of each plate 27 is so formed that when the grill frame 14 is lowered to its horizontal operating position the vertical edge 28 of the plate 27 abuts and bears against the adjacent side of the sleeve 17 and thereby fixedly holds the grill frame 14 in its horizontal position above the pan 9.

On the free edge of 29 of the grill frame 14 and adjacent a corner thereof is a pivoted latch 31 which can be turned to a position to embrace the adjacent vertical legs 3 when the grill frame is folded to a vertical position alongside the frame 1 thereby to hold the grill in folded position.

On the outer sides of the grill frame 14, the sides which are at right angles to the frame 1, are provided vertical lugs 32, one of which has a bearing hole 33 therein and the other has a bearing fork 34 in its top for the accommodation of a suitable rotating spit 36. On the middle of the cross frame 16 is provided a vertical pocket 35 in which pocket 35 is insertable a base flange 38 of an electric motor 39, the shaft 41 of which latter is extended parallel with the spit 36 and is connected to said rotating spit by any suitable transmission such as the sprocket and chain transmission 42. This device is easily mounted on the grill frame 14 when so desired and is also easily removed.

For facilitating the transportation, folding and assembling of the device, a handle 43 is provided on the side of the pan 9 adjacent to the frame 1 so as to facilitate the lowering or raising of the pan 9.

For the purpose of using the grill frame at table height when so desired, the bottom end of each leg 3 has a socket 44 therein and the corners 46 of the pan 9 also have sockets 47 therein, either threaded or smooth, for accommodating suitable legs 48 which can be inserted in place to support the pan 9 and the frame 1 in a position spaced from the ground level and thereby allowing the barbecuing operation to be performed at a suitable height.

The device can be easily knocked down by lifting the pan 9 so as to release it from the bayonet slots 11 and from the bolts 8; then the accessories can be stored in the pan 9. The drill frame 14 is folded alongside the frame 1 and the latch 31 is hooked over the adjacent leg 3 of the frame 1. Then the frame can be laid flat over the pan 9 and the device can be carried or stored as a compact unit. For indoor use in a fireplace, the pan 9 is mounted on the bottom of the frame 1 as previously described, the grill frame 14 is lowered to a selected spacing or distance from the pan 9 and the charcoal or other fire is placed in the pan 9 and ignited in the usual manner after the device is rolled into the fireplace in such a way that the U-shaped frame is toward the outside or the operator. Thus all the fumes and smoke escape through the regular flue or chimney of the fireplace and the barbecuing can be performed with convenience in the average fireplace. In the event of outdoor use or certain indoor uses, the device can be elevated to a higher level by the insertion of the extension legs 48.

This device is simple in construction, does not require any accurate adjustment or manipulation. It is eminently adapted for its purposes.

I am aware that some changes may be made in the general arrangements and combinations of the several devices and parts, as well as in the details of the construction thereof without departing from the scope of the present invention as set forth in the following claim; hence I do not limit my invention to the exact arrangements and combinations of the said device and parts as described in the said specification, nor do I confine myself to the exact details of the construction of the said parts as illustrated in the accompanying drawings.

I claim:

In a portable barbecue of the character described, a generally vertical open frame, a portion of the frame being formed into a handle, a fire carrying element on the frame extended to one side only of the frame, a grill frame, adjustable means to mount the grill frame on the open frame so that said grill frame extends only to the side of the frame above said fire carrying element; the said open frame being sufficiently open to permit access to said fire carrying element and to said grill frame therethrough from the other side of said open frame, and rolling elements on the lower end of said open frame extending oppositely to said fire carrying element, a pivot connection between said grill frame and said mounting means to permit the folding of said grill frame to a position adjacent to and alongside said open frame, and releasable means to secure said grill frame in said folded position, means to detachably secure said fire carrying element to said open frame, said means for mounting said grill frame comprising a cross-frame slidable on said open frame toward and away from said fire carrying element, handles on said cross-frame and means on said handles for releasably fastening said cross-frame in adjusted position on said open frame, vertical bearing elements extended from said grill frame upwardly to accommodate a spit, and an engagement element on said cross frame to support a driving mechanism for said spit on the other side of said open frame in operative relation to said spit.

References Cited in the file of this patent

UNITED STATES PATENTS

| | | |
|---|---|---|
| 454,537 | House | June 23, 1891 |
| 2,058,172 | Myers | Oct. 20, 1936 |
| 2,198,134 | Spiegl | Apr. 23, 1940 |
| 2,213,483 | Benson | Sept. 3, 1940 |
| 2,425,036 | Howe | Aug. 5, 1947 |
| 2,515,521 | Loffredo | July 18, 1950 |
| 2,516,260 | Schildmeier | July 25, 1950 |
| 2,559,710 | Danielson | July 10, 1951 |
| 2,577,963 | Hagspian | Dec. 11, 1951 |
| 2,600,234 | Foley | June 10, 1952 |
| 2,608,149 | Ellis | Aug. 26, 1952 |
| 2,608,190 | Winning et al. | Aug. 26, 1952 |
| 2,629,315 | Schaar | Feb. 24, 1953 |
| 2,783,705 | Vrionis | Mar. 5, 1957 |

FOREIGN PATENTS

| | | |
|---|---|---|
| 567,564 | Great Britain | Feb. 20, 1945 |